United States Patent [19]

Fritts et al.

[11] 4,242,179

[45] Dec. 30, 1980

[54] METHOD OF FABRICATING CADMIUM ELECTRODES

[75] Inventors: David H. Fritts, Dayton; John F. Leonard, Xenia; Thirumalai G. Palanisamy, Fairborn, all of Ohio

[73] Assignee: The United States of America as represented by the Secretary of the Air Force, Washington, D.C.

[21] Appl. No.: 61,558

[22] Filed: Jul. 27, 1979

[51] Int. Cl.³ .......................... C25D 9/08; C25B 1/16
[52] U.S. Cl. ................................. 204/2.1; 204/56 R
[58] Field of Search ............................. 204/2.1, 56 R

[56] References Cited

U.S. PATENT DOCUMENTS

| | | | |
|---|---|---|---|
| 3,335,033 | 8/1967 | Kober | 204/56 R |
| 3,484,346 | 12/1969 | Bulan et al. | 204/56 R |
| 3,873,368 | 3/1975 | Pickett | 204/2.1 |
| 4,120,757 | 10/1978 | Seiger et al. | 204/56 R |
| 4,132,606 | 1/1979 | Crespy | 204/56 R |
| 4,139,423 | 2/1979 | Pensabene et al. | 204/2.1 |

Primary Examiner—Tufariello, T. M.
Attorney, Agent, or Firm—Donald J. Singer; Robert Kern Duncan

[57] ABSTRACT

The fabrication of porous cadmium electrodes is disclosed in which high cadmium loading without surface buildup is obtained by using a relatively low current density (approximately 0.2 amperes per square inch of plaque area) and period current reversals of time durations approximately equal to 15% of the forward time durations at a current density substantially equal to the forward current density.

5 Claims, 1 Drawing Figure

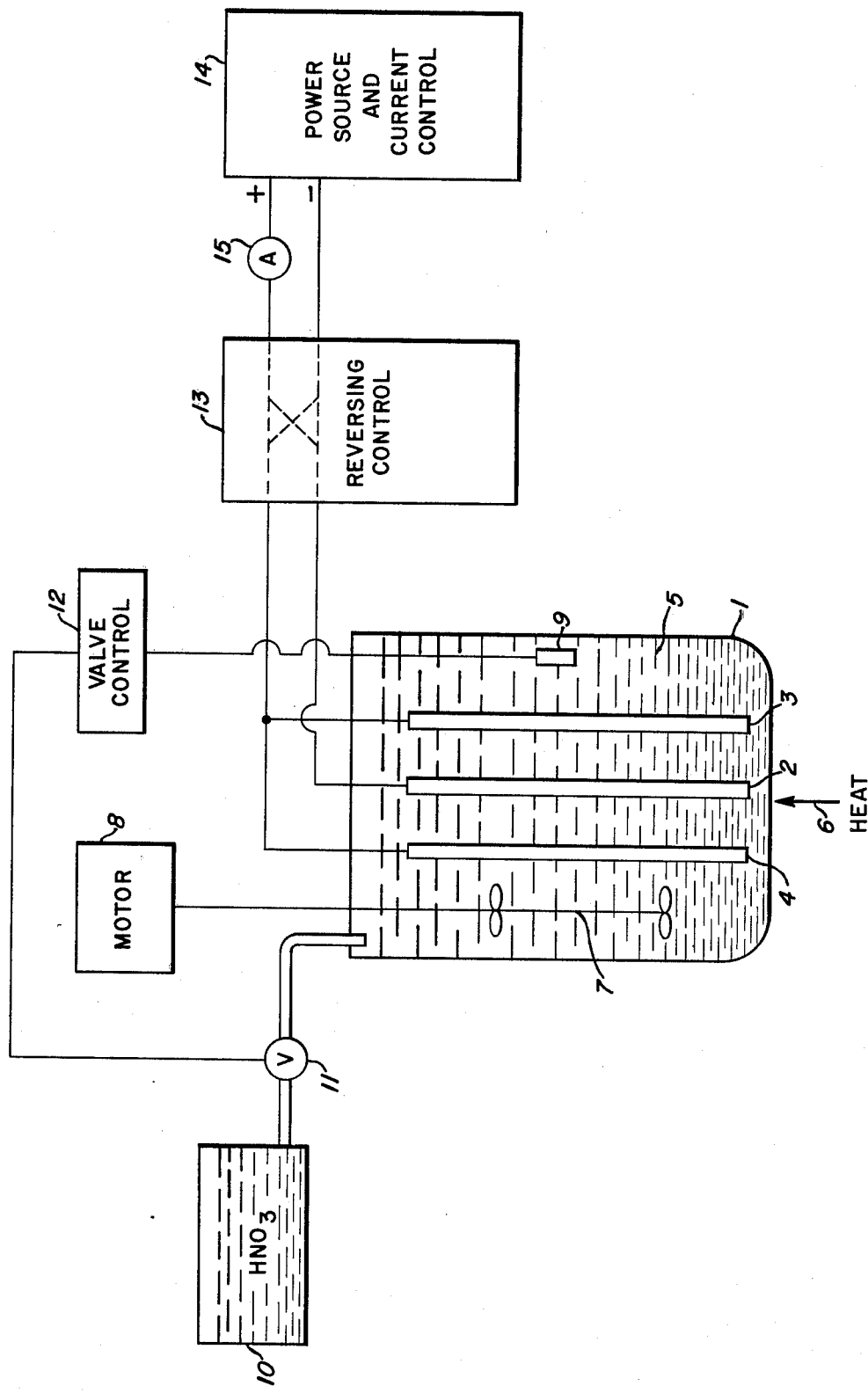

METHOD OF FABRICATING CADMIUM ELECTRODES

RIGHTS OF THE GOVERNMENT

The invention described herein may be manufactured and used by or for the Government of the United States for all governmental purposes without the payment of any royalty.

BACKGROUND OF THE INVENTION

The previous manufacturing of porous cadmium electrodes for use in nickel-cadmium and silver-cadmium batteries, for example, has been severely restricted due primarily to being unable to obtain high cadmium loadings without surface buildup, plus the requirement of frequent cleaning of the cadmium counter electrodes, and the requirement after impregnating the plaque of an additional formation step (running the plaque in a K(OH) solution) and cleaning and scrubbing the plaque.

The best known prior art is that contained in U.S. Pat. Nos. 3,873,368 to patentee Pickett, 4,120,757 to patentees Seiger et al, and 4,139,423 to patentees Pensabene et al.

SUMMARY OF THE INVENTION

The invention provides a method for fabricating porous cadmium electrodes that have a high cadmium loading without surface buildup, also cleaning of the cadmium counter electrodes is eliminated and the previously required formation step is no longer necessary.

BRIEF DESCRIPTION OF THE DRAWING

The drawing schematically illustrates a typical embodiment of apparatus for practicing the disclosed method.

DESCRIPTION OF THE PREFERRED METHOD

The drawing illustrates, in simplified schematic form, typical apparatus for practicing the disclosed method. A conventional container 1, such as a beaker, contains the electrodes 2, 3 and 4 and the solution 5. Electrode 2 is the battery electrode plaque. At the start of the process it is a conventional porous (sintered) nickel plaque on and in which cadmium is to be deposited. Electrodes 3 and 4 are conventional cadmium counter electrodes. All the electrodes are conventionally supported and positioned in the solution by Teflon holders (not illustrated). The 2 molar $Cd(NO_3)_2$ solution 5 is preferably maintained at a temperature between 80° C. and 85° C. by a conventional heat source supplying heat 6 to the solution. Satisfactory operation of the process can be obtained over a temperature range of 80° C. to 100° C. The lower temperature range of 80° C. to 85° C. results in a softer more readily shed $Cd(OH)_2$ buildup on the cadmium counter electrodes. It is also desirable to maintain the pH of the solution approximately 3.5±1 with the optimum value being approximately 3.5±0.2 for a 2 molar $Cd(NO_3)_2$ solution. Changes in the impregnation solution molarity changes the optimum pH. The desired molarity of the impregnation solution is primarily determined by conductivity and saturation considerations. Generally, the preferred solution molarity is the highest degree of saturation while maintaining usable conductivity.

Continuous mixing of the solution is required while the process is in operation to diffuse the $HNO_3$ throughout the impregnation bath and to minimize temperature gradients in the solution. This mixing is conventionally done with mixing blade tool 7 driven by motor 8. The conventional pH sensor 9 senses the pH of the solution and periodically additional $HNO_3$ is added to the solution 5 by conventional valve 11 and conventional valve control circuit 12 to maintain the pH of the solution at approximately 3.5.

When a current is passed between the counter electrodes 3 and 4, and the battery electrode plaque 2, with the plaque 2 a negative polarity, with respect to the counter electrodes cadmium is deposited in the battery plaque electrode 2. The preferred current density, as indicated by ammeter 15 divided by the plaque frontal area, is approximately 0.2 amperes per square inch of plaque area. Periodically, for approximately 10% to 20% of the time, the current flow from the power source and current control 14 through the electrodes and the solution is reversed by the reversing control 13. The current flow, as indicated by the ammeter 15, is substantially the same magnitude for both the forward and reverse current flows. The current reversal performs two functions (1) it keeps the pores open at the electrode surface to allow interior impregnation and (2) it tends to loosen the $Cd(OH)_2$ buildup on the cadmium counter electrodes.

The same counter electrodes are normally used to impregnate many battery electrodes, the number being primarily dependent upon the original counter electrode thickness. As the counter electrodes are consumed a $Cd(OH)_2$ film builds up on the counter electrodes which increases the voltage required from the power source 14 to drive a given current density, i.e., maintain the same current as indicated on the ammeter 15. This increased voltage causes increased parasitic reactions (currents) thus impregnation time increases with the total time accumulated on the counter electrodes. This is illustrated by the following Tables 1 and 2. Table 1 illustrates three typical consecutive runs, providing three battery electrodes, for nominal battery plaque loadings of approximately 0.9 grams per square inch of electrode plaque. Table 2 illustrates four consecutive runs on another setup for providing nominal loadings of approximately 0.7 grams per square inch. These data were taken using approximately a 0.030 inch thick nickel plaque of approximately 80% porosity. The cadmium counter electrodes were approximately 3/16 inch thick, and the spacing between the battery electrode plaque and the counter electrodes was approximately ½ inch. (The electrodes were approximately 3 inches by 3 inches square.)

TABLE 1

| Consecutive Runs on Counter Electrode | Nominal Loading of 0.9 gms/in² | | |
|---|---|---|---|
| | Impregnation time for plaque (hrs) | Total Time on Counter Electrode (hrs) | Loading in Plaque gms/in² |
| 1 | 3.32 | 3.32 | .92 |
| 2 | 3.54 | 6.86 | .98 |
| 3 | 3.86 | 10.72 | .88 |

TABLE 2

| Consecutive Runs on Counter Electrode | Nominal Loading of 0.7 gms/in² | | |
|---|---|---|---|
| | Impregnation time for plaque (hrs) | Total Time on Counter Electrode (hrs) | Loading in Plaque gms/in² |
| 1 | 2.84 | 2.84 | .69 |

TABLE 2-continued

| Nominal Loading of 0.7 gms/in² | | | |
|---|---|---|---|
| Consecutive Runs on Counter Electrode | Impregnation time for plaque (hrs) | Total Time on Counter Electrode (hrs) | Loading in Plaque gms/in² |
| 2 | 2.98 | 5.82 | .71 |
| 3 | 3.16 | 8.98 | .69 |
| 4 | 3.40 | 12.38 | .81 |

Impregnation time is also dependent on the amount of current reversal time, i.e., 10 minutes of reversal current time will nullify a previous 10 minutes of forward current time and require an additional 10 minutes of forward time for the impregnation to be equivalent to that before the reversal took place. Thus to provide an impregnation magnitude equal to the magnitude obtained by running for t time without reversal requires a total operating time of $t + 2t_R$ where $t_R$ is the time of reverse current flow. The magnitude of film buildup on the counter electrodes is a function of the frequency of current reversals. Generally, if an observable buildup starts to show the frequency of reversals is too low. In many typical operating systems, approximately 50 seconds forward current followed by approximately 10 seconds of reversed current had been found to be a suitable frequency of reversals.

The spacing of the battery plaque electrode from the counter electrodes is not critical. It is primarily determined from the physical characteristics of the impregnation bath and ease of handling. In the systems described, satisfactory operation has been obtained where the one-half inch spacing between electrodes has been held to within ±20%. This will provide a suitable current density in consideration with the other foregoing enumerate operating parameters.

After the required impregnation time (generally about 3 hours) the plaque is removed from the solution, rinsed in pure water to remove the residual $Cd(NO_3)_2$ solution, and dryed. It is then ready for use in a battery.

We claim:

1. An improved method for impregnating a sintered porous nickel plaque having a porosity of about 70 to 90% to form a cadmium battery electrode which comprises the steps:
   a. positioning the said plaque in a $Cd(NO_3)_2$ solution in spaced apart relationship between cadmium counter electrodes;
   b. heating the said solution to a temperature between 80° C. and 100° C.;
   c. maintaining the said solution at a pH of 2.5 to 4.5 by the periodic addition of $HNO_3$;
   d. diffusing the $HNO_3$ throughout the solution, and minimizing temperature gradients throughout the solution by continuous mixing of the solution;
   e. maintaining a current flow in the solution between the plaque and the said counter electrodes to provide a current density of approximately 0.2 amperes per square inch of plaque area;
   f. reversing the said current flow periodically;
   g. removing the said plaque from the solution;
   h. washing the plaque in substantially pure water; and
   i. drying the plaque.

2. The method as claimed in claim 1 wherein the said $Cd(NO_3)_2$ solution is a two-molar solution and the said pH of the solution is maintained at a pH of 3.3 to 3.7.

3. The method as claimed in claim 2 wherein the time that the plaque is a positive potential with respect to the counter electrodes is approximately 15% of the time that the plaque is a negative potential with respect to the counter electrodes.

4. The method as claimed in claim 3 wherein the period of the said periodic reversal of current is approximately one minute.

5. The method as claimed in claim 4 wherein the said spacing between the said plaque and the said counter electrodes is approximately ½ inch.

* * * * *